March 24, 1936.  E. L. JOHNSON ET AL  2,035,371
LIQUID FLOW MEASURING AND CONTROL APPARATUS
Filed Oct. 14, 1932  2 Sheets-Sheet 1

Inventors
Elmer L. Johnson,
Joseph G. Prosser,

Edmund H. Parry
Attorney

March 24, 1936.  E. L. JOHNSON ET AL  2,035,371
LIQUID FLOW MEASURING AND CONTROL APPARATUS
Filed Oct. 14, 1932   2 Sheets-Sheet 2
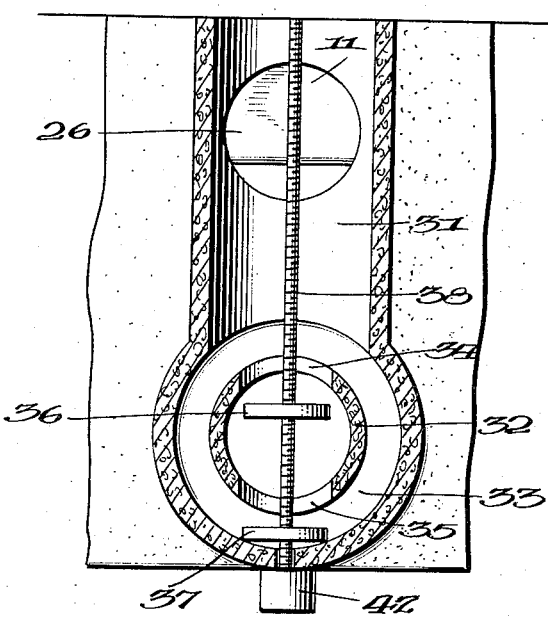
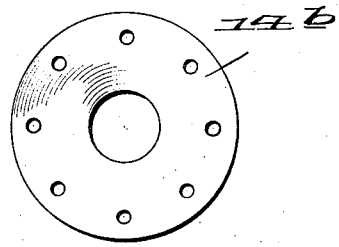
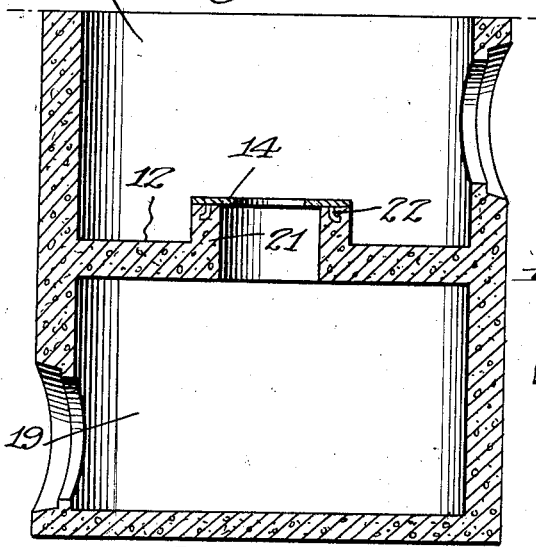
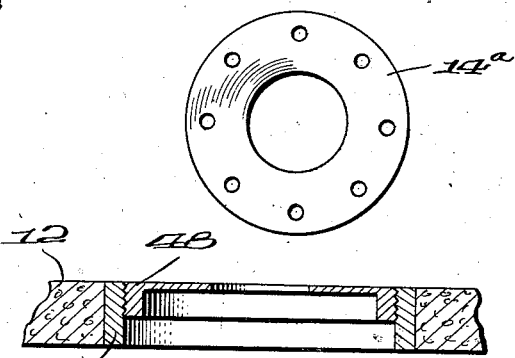
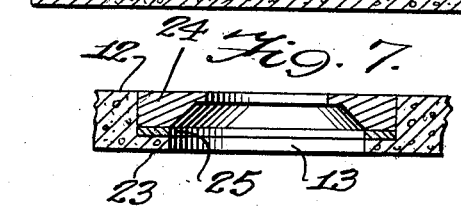
Inventors
Elmer L. Johnson,
Joseph G. Prosser,
By Edmund H Parry
Attorney Patented Mar. 24, 1936

2,035,371

UNITED STATES PATENT OFFICE 2,035,371

LIQUID FLOW MEASURING AND CONTROL APPARATUS

Elmer Louis Johnson, Loma Linda, and Joseph G. Prosser, Pasadena, Calif., assignors to Concrete Conduit Company, Ltd., Colton, Calif., a limited company of California Application October 14, 1932, Serial No. 637,845

4 Claims. (Cl. 73—167)

This invention relates to the measurement and control of the flow of liquids such as water from a source of supply, and has particular reference to a device for accurately measuring flow under any conditions such as ordinarily exist in supply lines. The invention also contemplates the provision of mechanism for regulating the amount of flow to the measuring device and means whereby the flow thereto may be maintained constant, the former being useful in association with the measuring mechanism where the flow desired is less than the flow of the supply and where the requirements may change, the latter serving to maintain a metered flow in instances where the flow in the supply line is subject to fluctuations.

In agricultural sections where water must be carried long distances through conduits it is frequently desirable to determine what the amount of water actually supplied, as determined by the rate of flow through the conduit, may be. The desired check has in the past been usually made by means of rectangular weirs into which the water is fed and then allowed to discharge through a notch of determined size provided in a partition therein. Such devices while enabling the velocity or flow of water to be determined are far from accurate and can be satisfactorily used only by skilled persons. In the first place a considerable change of flow in the incoming supply line ordinarily will not cause any substantial change in level in the weir with the result that an accurate determination cannot be made. Again, with such devices it is necessary to take account of the velocity at which the water enters the weir which complicates the finding of the true rate of flow. These weirs when constructed to be sold at a reasonable price have an inaccuracy factor as high as 15%, and when made more elaborately to give greater accuracy they are so expensive that water users are at a disadvantage in attempting to determine exactly how much water is being supplied to them through their pipe lines.

The essential purpose of the present invention is to provide a simple liquid measuring device which will give a reading of the rate of flow which is accurate to within one-half of one per cent. For practical reasons such accuracy is extremely desirable. The construction of the device should be carried out carefully in order to attain accuracy but may be done cheaply, and the arrangement is such that the same may be used equally well by skilled and unskilled persons.

In addition to measuring means the proposed device includes regulatory mechanism which in cooperation with the measuring means will enable the flow of liquid to be varied to suit needs. Provision is also made, as desired, so that a constant supply of liquid may be obtained at the desired rate which will not vary under changes in flow in the supply line.

In the accompanying drawings we have illustrated one embodiment of our invention wherein:

Fig. 3 is a fragmentary view of our device in sectional elevation taken on the line 3—3 of Fig 1;

Figs. 4 and 5 show several sizes of orifice plates which may be used in our device;

Fig. 6 is a fragmentary view in sectional elevation illustrating a modification;

Fig. 7 is an enlarged fragmentary view of a further modification of the orifice plate.

Fig. 8 is a view similar to Fig. 7, showing a variation of the construction illustrated therein.

Figure 1:
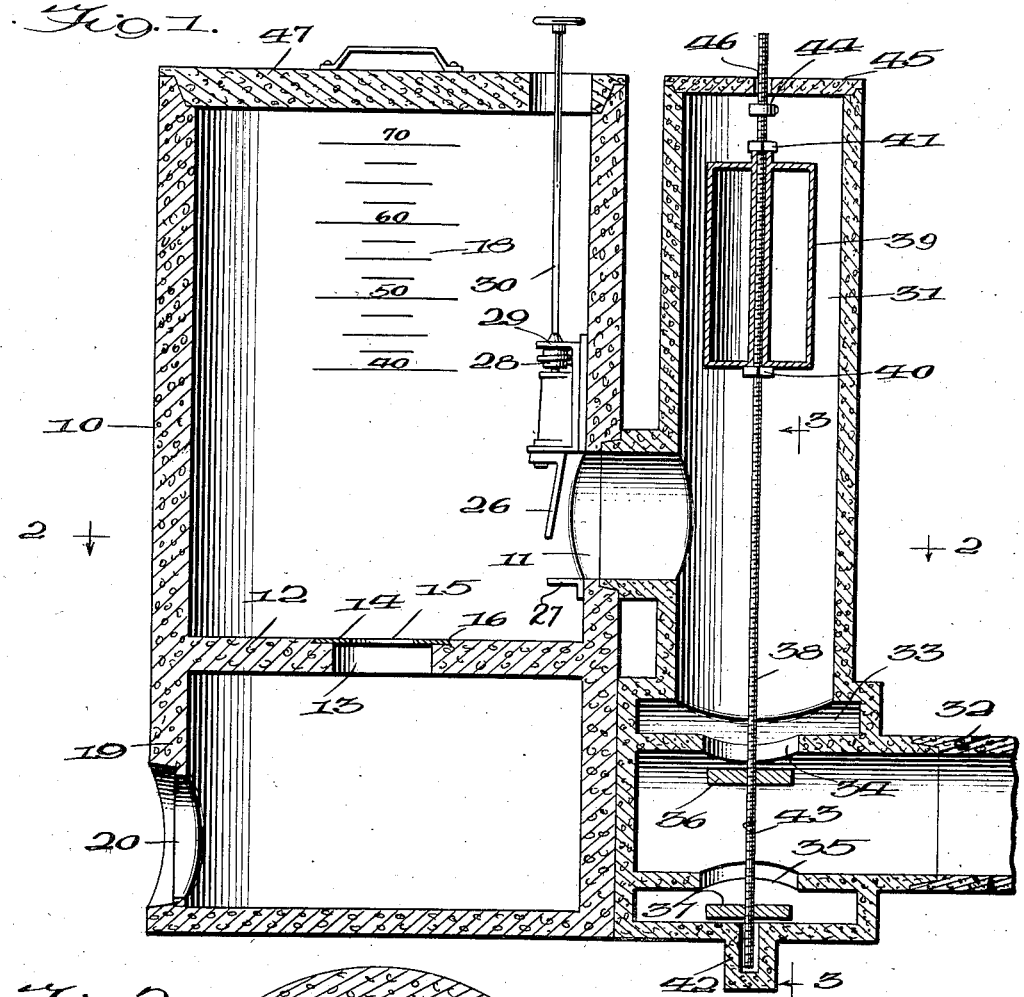
Fig. 1 is a view in sectional elevation.
Figure 2:
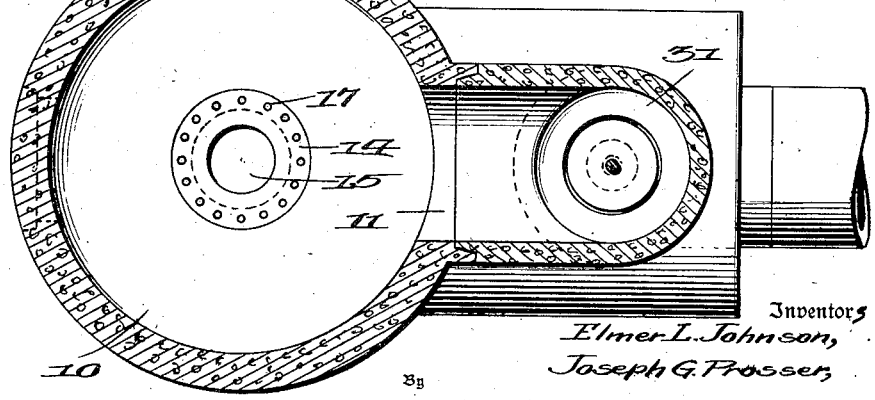
Fig. 2 is a view in transverse section taken on line 2—2 of Fig. 1.

Referring now to Figs. 1, 2, and 3, our device comprises essentially a vessel 10 which may be designated the measuring chamber. Liquid from a supply line to be measured is introduced into the same through any suitable inlet such as the port 11. At the lower end of the tank, preferably although not necessarily, in the bottom portion 12 is a liquid outlet 13. To determine the flow of liquid through the outlet the latter is provided with a plate 14 having an orifice 15 of carefully measured size therein.

The measuring vessel may conveniently be made of composition material such as concrete, cement, or tile, and comprise a pipe similar to those frequently used in the supply line. As above indicated, however, the lower end thereof is closed by a bottom portion 12. The orifice plate 14 should be relatively thin and may be made of one-sixteenth or one-eighth inch metal plate, it being obvious that such a construction will remove various factors from consideration in determining accurately the flow of liquid through the outlet. The plate should be so disposed in the chamber and surrounding portions of the chamber should be such as to allow free flow of liquid to and through the orifice plate. It is therefore desirable that the plate be secured in place without the use of bolts or other fastening means which might form obstructions to the flow of liquid. I have found that the orifice plate may be conveniently secured in place by pressing the same against the wall of the concrete chamber while the latter is still soft, or applying a layer of cement to the wall which will receive the plate, causing the plate to sink into the material until its inner surface is flushed with the surface of the material. The bond between the concrete and the orifice plate may be enhanced by providing the plate with beveled edges as indicated at 16 in Fig. 1, or the plate may be provided with a series of holes 17 through which the concrete will be forced when the plate is pressed into the wall, each being preferably beveled.

The size of the orifice 15 in the plate 14 and the capacity of the measuring chamber will be generally determined by the size of the supply pipe and the pressure therein, and the amount of water which is required for use. The area of the opening in the orifice plate will determine the flow of liquid from the measuring tank, the rate of flow varying as the square root of the head. Taking any given head of liquid and knowing the size of the orifice the rate of flow can readily be determined.

To enable the rate of flow passing through the measuring chamber to be determined I provide a gauge 18 which may be conveniently disposed on the wall of the tank. Such gauge may be graduated in units of flow such as cubic feet per second or miner inches. With a steady supply of liquid to the measuring chamber the level therein will give an accurate indication of the rate of flow out of the tank through the orifice. In Fig. 1 the gauge 18 is calculated in Southern California miner inches. Thus a direct reading of the flow of liquid through the measuring chamber may be obtained and since the chamber is subject only to air pressure at its upper end the readings do not require that the pressure of the incoming supply be taken into account.

The size of the orifice which will give a desired rate of flow will be determined in accordance with the head in the supply line from the ordinary laws governing the flow of liquids.

It is desirable that below the measuring chamber 10 a chamber 19 be provided into which the discharge from the orifice goes before entering a pipe line. It is obvious that if there be any back line pressure of liquid against the orifice plate the accuracy of the device will be materially affected. By making the chamber of proper capacity and depth the liquid discharge from the orifice can be conducted out to a pipe line through a port 20 without filling the chamber 19. Under such conditions there will be an air space between the liquid in the chamber 19 and the discharge orifice 15.

In lieu of or in addition to the arrangement just described the orifice plate 14 may be raised slightly above the lower end of the measuring chamber 10 with a view of preventing back pressure of liquid on the orifice plate. Such an arrangement is shown in Fig. 6 wherein the orifice plate 14 is raised by a wall 21 above the bottom 12 of the chamber. The plate 14 may be secured in place by means of pins 22.

In Figs. 4 and 5 I have shown respectively orifice plates 14a and 14b which have different size openings. The size of the orifice plate will be determined in accordance with the head and the flow of liquid desired. The size of the orifice may vary from one or two inches to ten inches or more in accordance with flow requirements.

It may be that circumstances will require a different rate of flow at different times. It is therefore desirable to provide means whereby the flow through the measuring chamber may be increased. To this end it is proposed to provide an arrangement of the outlet whereby various sizes of orifice plates may be interchangeably used. One arrangement suitable to this end is illustrated in Fig. 7 wherein the wall of the outlet 13 is provided with a shoulder 23 upon which an orifice plate may seat. Interchangeable orifice plates such as indicated at 24 can be received in such manner that their upper surface will be flush with the inside wall of the measuring vessel. To prevent leakage a gasket 25 may be provided between the orifice plate and its seat on the shoulder 23. Instead of this construction a threaded plate 48, as shown in Fig. 8, may be used, the same fitting a ring 49 set into the wall of the vessel.

Since the pressure in the supply line may vary, and in order to enable the exact required amount of water to be supplied to the user, a regulatory mechanism, preferably in the form of a valve, is provided in association with the inlet to the measuring vessel. Various types of valves may be used. I have found that a gate valve such as indicated at 26 in Fig. 1 is quite satisfactory. Such valve may be located outside of the measuring vessel, or inside as shown. A seat 27 will be provided in the latter event surrounding the inlet opening 11 with which the valve 26 will cooperate. The valve may be controlled through a worm 28 and a rack 29 which is connected to the member 26 and a rotatable rod 30 extending upwardly and provided with a handle at its upper end. By this arrangement the valve may be readily raised or lowered until the level of liquid in the chamber indicates that the desired rate of flow is being obtained.

Since the rate of flow to the measuring device is subject to fluctuations due to differences in pressure in the supply line, the quantity of liquid passing through the measuring chamber would under such circumstances vary from time to time with the result that it would be impossible to know how much liquid had actually been supplied over any given period unless frequent readings be taken from the gauge. It is therefore desirable to provide means in association with the measuring instrument which will maintain a constant supply under the varying conditions of line pressure. Various expedients may be resorted to for this purpose. The simplest and most economical mechanism comprises an automatic valve adjustable in accordance with changes in conditions. The constant flow means is not to be confused with the valve mechanism heretofore described for regulating the quantity of liquid passing to the measuring chamber. The two mechanisms can be used independently or cooperatively in association with the measuring chamber, each functioning to its own purpose without in any way interfering with the action of the other.

The constant control means as shown in Figs. 1, 2 and 3 may comprise a chamber 31 into which the supply line 32 feeds, through an intermediate chamber 33 into which the supply pipe extends. The supply pipe is provided with one or more ports such as 34 and 35 which may be controlled by valves 36 and 37. It is not necessary that the valves be of a size to completely close the ports 34 and 35, it not being contemplated that this arrangement serve to completely cut off the flow. On the other hand, it is only necessary that when the valves 36 and 37 are in closed position with reference to the ports the flow allowed be the minimum which may be required for use. The chamber 31 connects with the inlet 11 of the measuring vessel so that water passing into the chamber under control of the valves will be transmitted into the vessel.

The valves 36 and 37 may be mounted upon a rod 38 extending upwardly through the chamber 31 and actuated by suitable means responsive to changes in line pressure. Conveniently the actuating means may comprise a float 39 carried by the rod 38 and adjustably supported thereon by collars 40 and 41. The chamber 31 is intended to be subject at its upper end to atmospheric pressure so that the gas pressure therein will be the same as that in the measuring vessel 10. The float will be adjusted on the rod 38 so as to maintain the level at the desired height, being adapted to open or close the valves more in accordance with changes in level as determined by fluctuations in line pressure. The lower end of the rod may be guided and supported in a well 42 at the bottom of the intermediate chamber 33. To prevent the accumulation of foreign matter in the well such as might interfere with the proper operation of the valves the lower end of the rod 38 may be hollow and provided with an opening 43 which will cause some of the incoming liquid to pass downwardly through the rod to keep the well flushed.

To prevent the float from rising too high in the chamber 31 such as might occur under pressure surges in the line a stop 44 is provided near the upper end of the rod 38 cooperative with a cover 45 with which it is advisable to protect the chamber. Such cover is provided with an opening 46 through which the upper rod extends, the same also serving as a vent to maintain atmospheric pressure in the chamber. A similar cover 47 is desirably provided for the measuring chamber 10 to prevent the introduction therein of foreign matter which might impede the operation of the device.

According to the embodiment of our invention shown in Fig. 1 the orifice plate is permanently secured in the lower end of the measuring vessel 10. We have, however, pointed out that the size of the orifice plate determines the rate of flow through the vessel and that the rate of flow may be varied by using the different size plates of Figs. 4 and 5 interchangeably in the modified construction of Figs. 7 or 8.

It will be seen that we have provided a simple measuring device for determining liquid flow which is extremely efficient in operation and which permits great accuracy in determining the rate of flow. In the various embodiments shown and described the accuracy of the device is not affected by fluctuations in line pressure, and the changes in level of the liquid in the measuring vessel are sufficiently great under even moderate fluctuations in the flow of liquid from the supply line to enable a very precise reading of the flow from the measuring device. Since the gauge as proposed enables a direct reading of the rate of flow the device may be readily used by unskilled persons with complete success.

It will be understood that the various embodiments of our invention shown and described are illustrative merely and that the invention is capable of a considerable range of modification and equivalency. We do not therefore intend that our invention should be taken as limited by the details shown, but that the scope of the invention is to be determined in accordance with the appended claims.

What we claim is:

1. A liquid flow measuring and control device including a vessel, an inlet for liquid thereto, an outlet at its lower end separate from the inlet provided with an orifice determining the flow of liquid from the vessel, means for regulating the rate of flow of liquid to the vessel, means for maintaining a constant flow of liquid to the vessel, and a gauge upon which the level of liquid in the vessel will indicate the flow of liquid therefrom through the orifice.

2. A liquid flow measuring and control device including a vessel, an inlet for liquid thereto, a separate outlet at its lower end provided with an orifice determining the flow of liquid from the vessel, a valve for regulating the flow of liquid to the vessel, a chamber having a source of supply connecting with the vessel inlet and having means for maintaining the level of liquid in the vessel constant, and a gauge upon which the level of liquid in the vessel will indicate the flow of liquid therefrom through the orifice.

3. A liquid flow metering and measuring device for fluid distribution systems comprising a chamber provided with a supply inlet and an independent outlet port in the lower end of the chamber having no direct communication with the inlet, said outlet port being provided with a thin-edged orifice plate giving a substantially frictionless flow for metering the discharge flow from the chamber at a rate determined by the area of the orifice, the chamber being open to the atmosphere and having a large capacity and cross-sectional area in relation to the volumetric flow entering the inlet and in relation to the size of the orifice, so that the liquid in the chamber will be at atmospheric pressure and seek its level according to the rate of discharge through the outlet orifice entirely independently of the operating pressure head of the liquid supply entering the inlet, and whereby the discharge of liquid from the chamber through the outlet orifice is a metered gravity flow controlled by the size of the orifice and the height of liquid in the chamber independently of and unaffected by the operating pressure head of the liquid supply entering the chamber, and a gauge measuring the height of liquid in the chamber and indicating the flow rate of discharge from the chamber through the outlet orifice, and means comprising a float controlled valve for maintaining a constant flow of the incoming liquid through the supply chamber inlet, thereby to maintain the height of liquid in the chamber at a constant level and insure a constant rate of discharge from the chamber through the outlet orifice independent of fluctuations in the operating head of the incoming liquid supply.

4. A liquid flow metering and measuring device for fluid distribution systems comprising a chamber provided with a supply inlet and an independent outlet port in the lower end of the chamber having no direct communication with the inlet, said outlet port being provided with a thin-edged orifice plate giving a substantially frictionless flow for metering the discharge flow from the chamber at a rate determined by the area of the orifice, the chamber being open to the atmosphere and having a large capacity and cross-sectional area in relation to the volumetric flow entering the inlet and in relation to the size of the orifice, so that the liquid in the chamber will be at atmospheric pressure and seek its level according to the rate of discharge through the outlet orifice entirely independently of the operating pressure head of the liquid supply entering the inlet, and whereby the discharge of liquid from the chamber through the outlet orifice is a metered gravity flow controlled by the size of the orifice and the height of liquid in the chamber independently of and unaffected by the operating pressure head of the liquid supply entering the chamber, and a gauge measuring the height of liquid in the chamber and indicating the flow rate of discharge from the chamber through the outlet orifice, and means comprising a regulator for controlling the liquid flow to the chamber inlet, thereby to maintain the height of liquid in the chamber at a constant level and insure a constant rate of discharge from the chamber through the outlet orifice independent of fluctuations in the operating head of the incoming liquid supply.

ELMER LOUIS JOHNSON.
JOSEPH G. PROSSER.